(12) United States Patent
Brubaker et al.

(10) Patent No.: US 12,326,176 B2
(45) Date of Patent: Jun. 10, 2025

(54) BALL SCREW ASSEMBLY WITH INTEGRAL FORCE MEASUREMENT

(71) Applicant: JTEKT Bearings North America LLC, Greenville, SC (US)

(72) Inventors: Justin Brubaker, Greenville, SC (US); Robert Lukasiewicz, Simpsonville, SC (US)

(73) Assignee: JTEKT Bearings North America LLC, Greenville, SC (US)

( * ) Notice: Subject to any disclaimer, the term of this patent is extended or adjusted under 35 U.S.C. 154(b) by 484 days.

(21) Appl. No.: 17/742,756

(22) Filed: May 12, 2022

(65) Prior Publication Data

US 2022/0364618 A1    Nov. 17, 2022

Related U.S. Application Data

(60) Provisional application No. 63/188,546, filed on May 14, 2021.

(51) Int. Cl.
*F16D 65/18*    (2006.01)
*F16H 25/22*    (2006.01)
(Continued)

(52) U.S. Cl.
CPC ....... *F16D 65/183* (2013.01); *F16H 25/2214* (2013.01); *F16D 2121/24* (2013.01); *F16D 2125/40* (2013.01)

(58) Field of Classification Search
CPC ............... F16D 65/182; F16D 2121/24; F16D 2125/40; F16H 25/2214
(Continued)

(56) References Cited

U.S. PATENT DOCUMENTS

| 7,930,949 B2 | 4/2011 | Singh |
| 8,457,836 B2 * | 6/2013 | Balasu ................. B60T 17/221 |
| | | 244/118.6 |

(Continued)

FOREIGN PATENT DOCUMENTS

| DE | 102009038087 A1 | 2/2011 |
| DE | 102011005517 A1 | 9/2012 |

(Continued)

OTHER PUBLICATIONS

AM Precision Ball Screw Sensor, Sensor Technology for Ball Screws, AM Precision , 4 pages (2018).

(Continued)

*Primary Examiner* — Christopher P Schwartz
(74) *Attorney, Agent, or Firm* — Nelson Mullins Riley & Scarborough LLP (57) ABSTRACT

A ball screw assembly having a ball screw nut including an outer surface, an inner surface defining a central bore, and a ball track defined by the inner surface, a ball screw shaft including an outer surface defining a ball track, the ball screw shaft being disposed in the central bore so that the two ball tracks form a ball raceway, a first stopper disposed at a first end of the ball screw nut within the ball raceway, a plurality of main balls forming a ball train disposed in the ball raceway, a main spring assembly disposed in the ball raceway between a first end of the ball train and the first stopper, and a strain sensing element affixed to a flat surface portion defined by the outer surface of the ball screw nut.

19 Claims, 6 Drawing Sheets

(51) Int. Cl.
*F16D 121/24* (2012.01)
*F16D 125/40* (2012.01)

(58) Field of Classification Search
USPC .............................................. 188/72.7–72.8
See application file for complete search history.

(56) References Cited

U.S. PATENT DOCUMENTS

| | | | |
|---|---|---|---|
| 9,464,703 | B2 | 10/2016 | Jeng et al. |
| 10,100,891 | B2 | 10/2018 | Masuda |
| 10,612,632 | B2 | 4/2020 | Lin et al. |
| 10,767,741 | B1 | 9/2020 | Liu et al. |
| 10,794,682 | B2 | 10/2020 | Chen et al. |
| 10,914,368 | B2 | 2/2021 | Chen et al. |
| 11,320,028 | B2 | 5/2022 | Kubota et al. |
| 11,668,378 | B1 | 6/2023 | Yu et al. |
| 2014/0000993 | A1* | 1/2014 | No .................... F16D 65/18 188/72.8 |
| 2015/0096397 | A1 | 4/2015 | Jeng et al. |
| 2020/0217379 | A1* | 7/2020 | Odaira .................. F16D 65/183 |
| 2022/0128136 | A1 | 4/2022 | Kubota et al. |
| 2022/0356932 | A1 | 11/2022 | Lin et al. |
| 2023/0049077 | A1* | 2/2023 | Brubaker ................ F16H 25/24 |

FOREIGN PATENT DOCUMENTS

| | | |
|---|---|---|
| DE | 102010036096 B4 | 7/2016 |
| DE | 102017213801 A1 | 2/2019 |
| EP | 2650562 A1 | 10/2013 |
| JP | 2007225024 A | 9/2007 |

OTHER PUBLICATIONS

Gurad Plus Status monitoring of ball screws, Gurad Plus Status monitoring of ball screws, Gurad Plus, 8 pages (2017).
Hiwin i4.0BS Intelligent Ballscrew, Hiwin i4.0BS Intelligent Ballscrew, Hiwin, 2 pages (2020).

* cited by examiner

BALL SCREW ASSEMBLY WITH INTEGRAL FORCE MEASUREMENT

CLAIM OF PRIORITY

This application claims priority to U.S. Provisional Patent Application No. 63/188,546 filed May 14, 2021, the entire disclosure of which is incorporated herein.

FIELD OF THE INVENTION

The present invention relates generally to mechanical linear actuators. More particularly, the present invention relates to designs and assembly methods of ball screw assemblies and sensing linear forces therein.

BACKGROUND OF THE INVENTION

Figure 6:
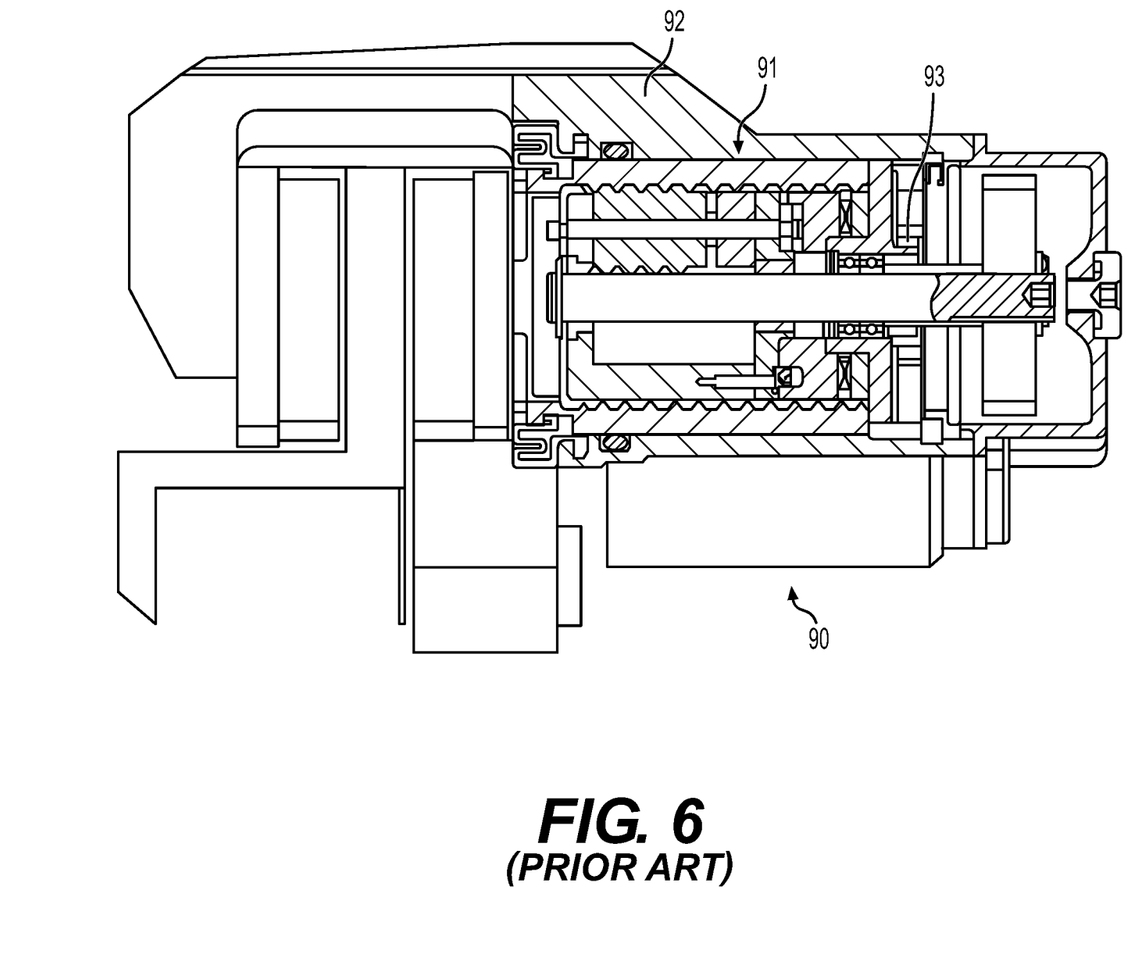
FIG. 6 is a schematic view of a brake assembly including a prior art ball screw assembly and load cell configuration.

Typical electro-mechanical brake systems 90, as shown in FIG. 6, require actuators that can provide a linear force, as well as brake clamping force feedback to the related vehicle control systems. An example linear actuator 91 is a ball screw assembly including a ball train interposed between a ball track formed in an outer surface of a ball screw shaft and a ball track formed in an inner surface of a ball screw nut. As shown, the current state of the art may achieve linear force sensing by positioning a dedicated load cell 93 between the actuator 91 and housing 92. However, the load cell 93 adds to the overall length of the assembly, therefore taking up valuable system space, and adds to the complexity of the system. As well, dimensional alignment of the load cell 93 to its mating components is critical for accurate and repeatable force sensing as well as the requirement of maintaining a minimum pre-load.

The present invention recognizes and addresses considerations of prior art constructions and methods.

SUMMARY OF THE INVENTION

One embodiment of the present disclosure provides a ball screw assembly having a ball screw nut including a first end, a second end, an outer surface, an inner surface defining a central bore, and a ball track defined by the inner surface, a ball screw shaft including an outer surface defining a ball track, the ball screw shaft being disposed in the central bore of the ball screw nut so that the ball track of the ball screw nut and ball track of the ball screw shaft form a ball raceway, a first stopper disposed at the first end of the ball screw nut within the ball raceway, a plurality of main balls forming a ball train, the ball train being disposed in the ball raceway, and a strain sensing element affixed to a flat surface portion defined by the outer surface of the ball screw nut.

Another embodiment of the present disclosure provides a brake assembly having a caliper including an arm portion, a piston disposed within the caliper, the piston being axially movable along a longitudinal center axis of the piston, a first brake pad affixed to the arm portion of the caliper, a second brake pad affixed to an end surface of the piston, a brake disc disposed between the first brake pad and the second brake pad, and a ball screw assembly including a ball screw nut including a first end, a second end, an inner surface defining a central bore, and a ball track defined by the inner surface, a ball screw shaft including an outer surface defining a ball track, the ball screw shaft being disposed in the central bore of the ball screw nut so that the ball track of the ball screw nut and ball track of the ball screw shaft form a ball raceway, a first stopper disposed at the first end of the ball screw nut within the ball raceway, a plurality of main balls forming a ball train, the ball train being disposed in the ball raceway, a main spring assembly disposed in the ball raceway between a first end of the ball train and the first stopper, and a strain sensing element affixed to a flat surface portion defined by the outer surface of the ball screw nut.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
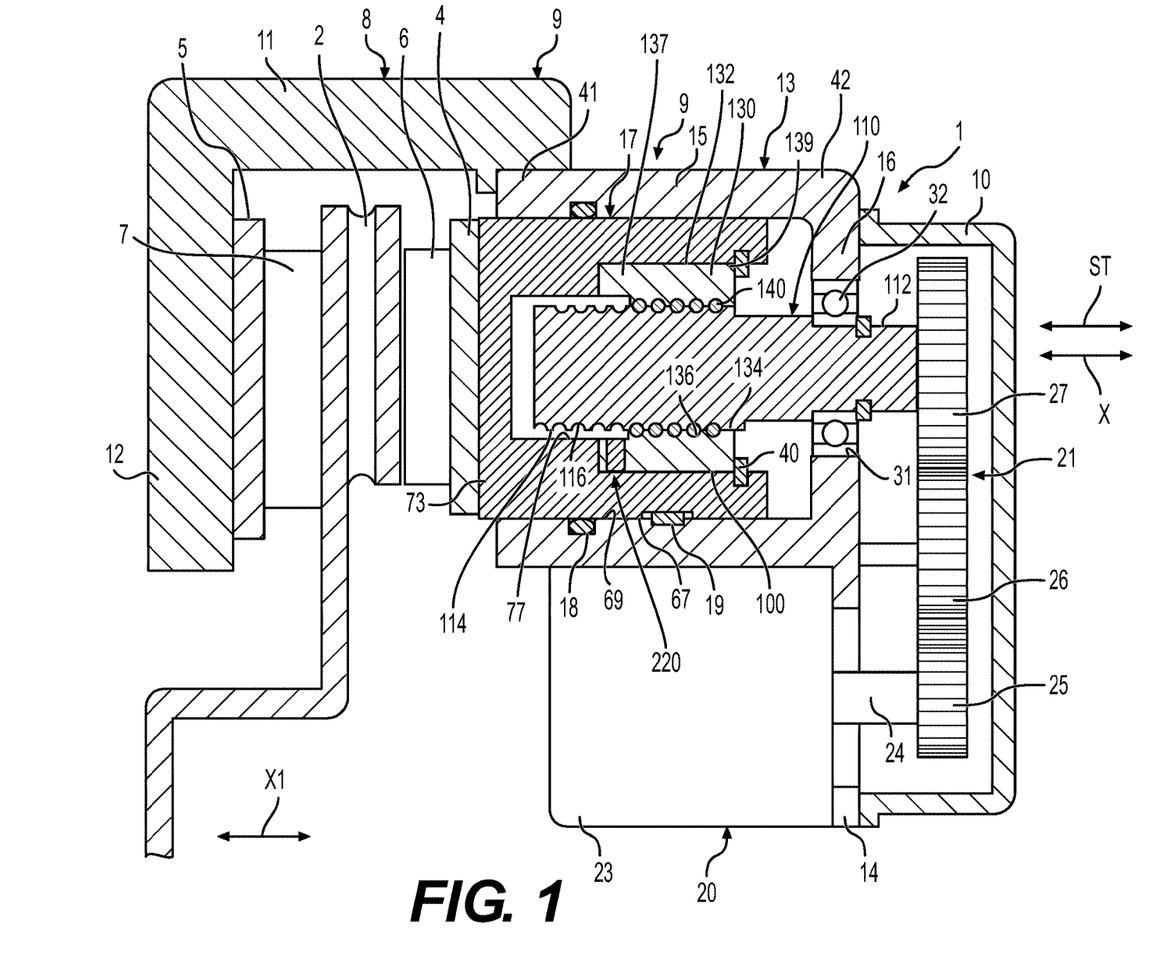
FIG. 1 is a schematic view of a brake assembly including an embodiment of a ball screw assembly in accordance with an embodiment of the present disclosure.
Figure 2:
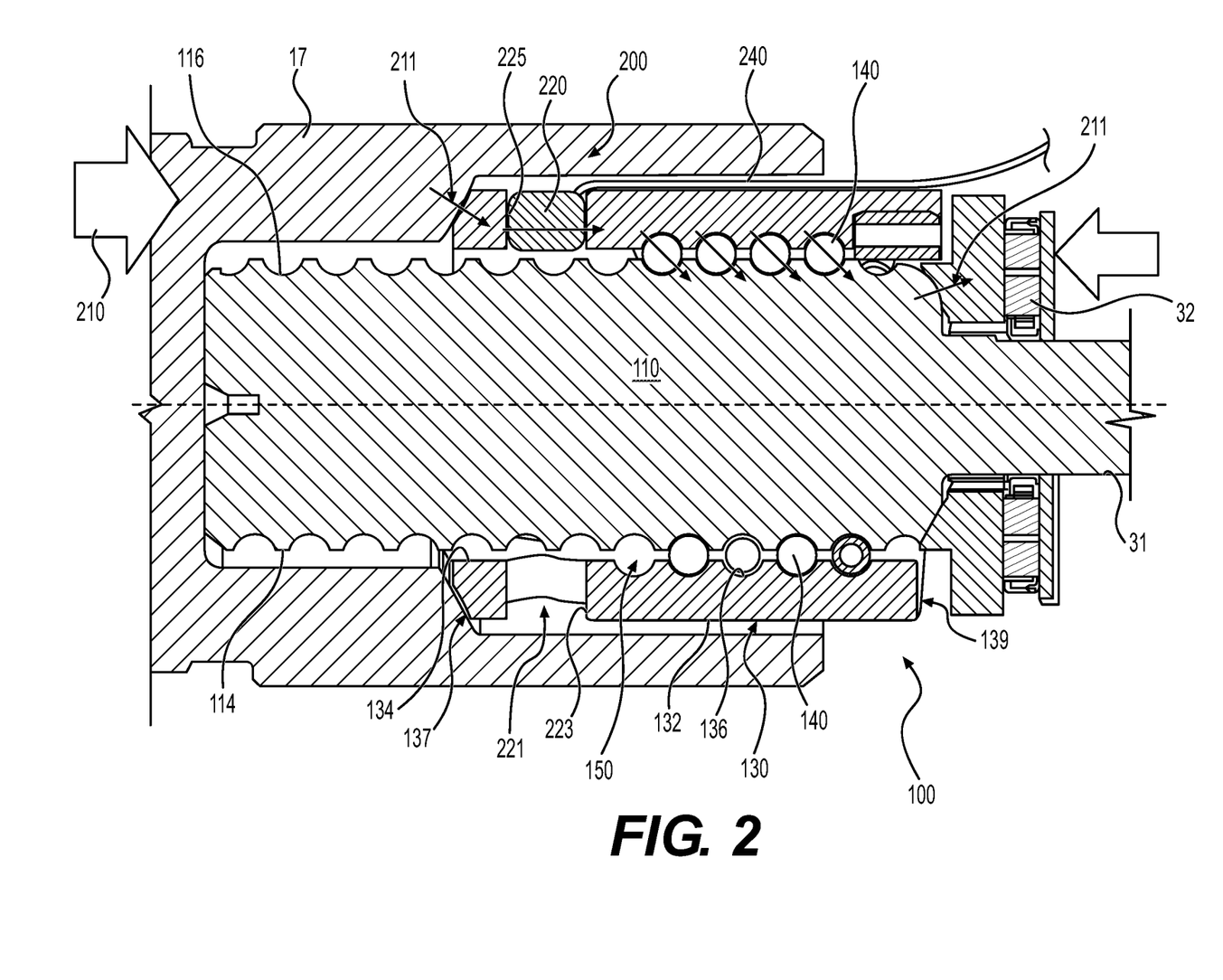
FIG. 2 is a partial cross-sectional view of the brake assembly shown in FIG. 1.
Figure 3:
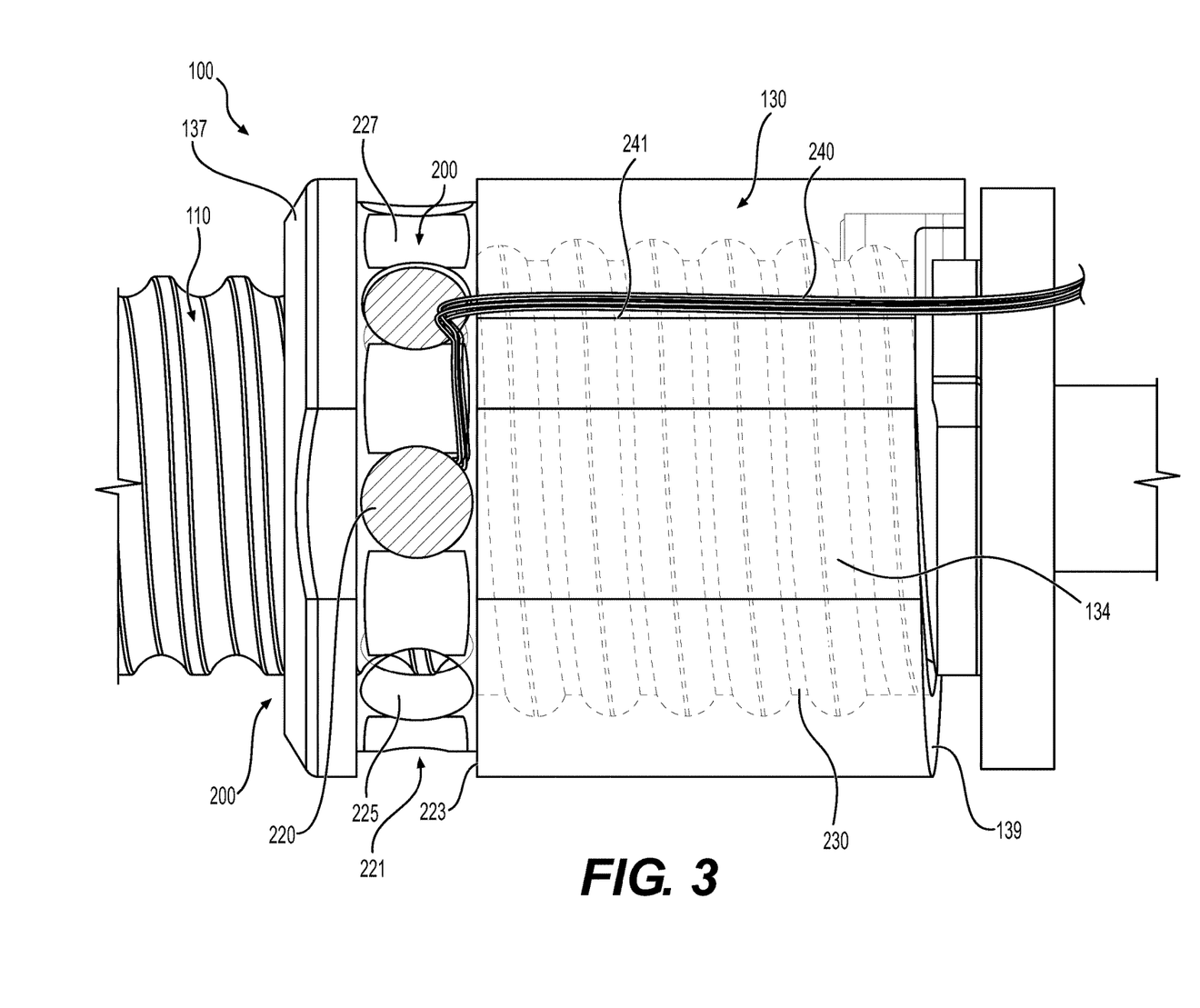
FIG. 3 is a side plan view of the ball screw assembly of the brake assembly shown in FIGS. 1 and 2.

As used herein, terms referring to a direction or a position relative to the orientation of the ball screw assembly in a brake system, such as but not limited to "vertical," "horizontal," "top," "bottom," "above," or "below," refer to directions and relative positions with respect to the ball screw assembly's orientation in its normal intended operation, as indicated in FIGS. 1 through 3. Thus, for instance, the terms "vertical" and "top" refer to the vertical orientation and relative upper position in the perspective of FIGS. 1 through 3 and should be understood in that context, even with respect to a ball screw assembly that may be disposed in a different orientation.

Further, the term "or" as used in this application and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "and," and "the" may include plural references, and the meaning of "in" may include "in" and "on." The phrase "in one embodiment," as used herein, does not necessarily refer to the same embodiment, although it may.

Referring now to the drawings, FIG. 1 is a schematic sectional view of a brake assembly 1 including a ball screw assembly 100 in accordance with a first embodiment of the present disclosure. As shown, the brake assembly 1 selectively applies a frictional braking force to a disc 2 rotating integrally with a wheel of an automobile or the like. The brake assembly 1 includes a caliper 3, a first backup plate 4 and a second backup plate 5, and a first pad 6 and a second pad 7. The caliper 3 is movably supported by a knuckle (not shown), and the first backup plate 4 and the second backup plate 5 are disposed on the caliper 3 so as to sandwich the brake disc 2 therebetween. The first pad 6 and the second pad 7 are fixed to the first backup plate 4 and the second backup plate 5, respectively, and can press respective side surfaces of the disc 2.

The caliper 3 includes a first body 8, a second body 9, and a cover 10. The first body 8 and the second body 9 are fixed together. The cover 10 is fixed to the second body 9. The first body 8 includes a body portion 11 and an arm portion 12. One end of the second body 9 is fixed to the body portion 11. The arm portion 12 is coupled orthogonally to the body portion 11. The second backup plate 5 is fixed to the arm portion 12. The second body 9 includes a brake cylinder 13 and an extension plate 14. The cylinder 13 is fixed to the body portion 11 of the first body 8. The extension plate 14 extends from the cylinder 13.

The cylinder 13 has a first end 41 and a second end 42 that are opposite to each other in an axial direction. The cylinder 13 includes a cylindrical portion 15 that is open at the first end 41 and an end surface plate 16 coupled to the second end 42 of the cylindrical portion 15. A piston 17 that is movable in the axial direction ST is housed in the cylinder 13. An end 73 of the piston 17 protrudes toward the disc 2 through an opening portion at an end of the cylinder 13 (that corresponds to the first end 41 of the cylindrical portion 15) and is fixed to the first backup plate 4.

A seal member 18 is interposed between a cylindrical outer surface 67 of the piston 17 and an inner surface of the cylinder 13 (that corresponds to an inner surface 69 of the cylindrical portion 15) to seal the gap between the outer surface 67 and the inner surface 69. The seal member 18 may be an O-ring housed in a housing groove formed in the inner surface 69 of the cylinder 13. The outer surface 67 of the piston 17 and the inner surface 69 of the cylinder 13 are coupled together via a key 19 provided in keyways formed in the outer surface 67 and the inner surface 69. Key coupling using the key 19 allows movement of the piston 17 in the axial direction ST to be guided and also allows rotation of the piston 17 with respect to the cylinder 13 to be regulated.

Hydraulic pressure that biases the piston 17 toward the disc 2 may be supplied into the cylinder 13 through a hydraulic path not depicted in the drawings. In that case, the cylinder 13 and the piston 17 form a hydraulic actuator. The caliper 3 functions to press both of the pads 6 and 7 against the disc 2 to generate a braking force. The caliper 3 includes an electric motor 20, a speed reduction apparatus 21, and the ball screw apparatus 100. The speed reduction apparatus 21 reduces the rotation speed of the electric motor 20. The ball screw apparatus 100 converts rotary motion transmitted from the electric motor 20 via the speed reduction apparatus 21 into linear motion of the piston 17 in the axial direction ST.

The electric motor 20 includes a motor housing 23 and an output shaft 24. The motor housing 23 is fixed to the extension plate 14 of the second body 9. The speed reduction apparatus 21 includes a driving gear 25, an idle gear 26, and a driven gear 27. The driving gear 25 is attached to one end of the output shaft 24 of the electric motor 20 so as to rotate together with the output shaft 24. The idle gear 26 meshes with the driving gear 25. The driven gear 27 meshes with the idle gear 26. The idle gear 26 is pivotally supported by the second body 9 so as to be rotatable. The cover 10 is fixed to the second body 9 so as to cover the speed reduction apparatus 21.

Referring additionally to FIG. 2, the ball screw assembly 100 includes a ball screw shaft 110 and a ball screw nut 130. The ball screw shaft 110 is an input member. The ball screw nut 130 is a rotatable output member screwed on the ball screw shaft 110 via a plurality of main balls 140. The ball screw shaft 110 is inserted through the ball screw nut 130. The ball screw shaft 110 is supported by the second body 9 (FIG. 1) of the brake assembly so that the ball screw shaft 110 is rotatable with respect to the second body 9 but axially restrained. The ball screw nut 130 is supported within the second body 9 by the piston 17 so as to be movable in the axial direction and to be non-rotatable with respect to the second body 9.

As shown, the ball screw shaft 110 is supported by a rolling bearing 32 held adjacent a support hole 31 formed in the end surface plate 16 of the cylinder 13 such that the ball screw shaft 110 is rotatable and immovable in the axial direction (axial direction ST). The driven gear 27 is coupled to an end 112 of the ball screw shaft 110 so as to rotate together with the ball screw shaft 110. As shown, the ball screw nut 130 has a cylindrical outer surface 132 and a cylindrical inner surface 134. A helically-shaped ball track 136 is defined by the inner surface 134. Similarly, the ball screw shaft 110 has a cylindrical outer surface 114 in which a helically-shaped ball track 116 is formed. The plurality of main balls 140 forms a ball train that is disposed in a ball raceway 150, as best seen in FIG. 2, defined between ball track 116 and ball track 136.

The outer surface 132 of the ball screw nut 130 also includes a rotation regulation portion (not shown). The rotation regulation portion is engaged with a rotation regulation portion (not shown) of an inner surface 77 of the piston 17. The outer surface 132 of the ball screw nut 130 is fitted within a bore defined by the cylindrical inner surface portion of the piston 17. The engagement between the rotation regulation portions prevents rotation of the piston 17 and the ball screw nut 130 with respect to each other. In alternate embodiments, the outer surface of the ball screw nut 130 may have flat surfaces 134 (FIG. 3) that engage correspondingly-shaped surfaces in the bore of the corresponding piston (not shown) to prevent rotation of the ball screw nut 330 with regard to the piston.

Still referring to FIGS. 1 through 3, the ball screw nut 130 includes a first end 137 and a second end 139, the first end 137 of the ball screw nut 130 being disposed axially-inwardly into the piston 17 as compared to the second end 139. A retaining ring (annular member) 40 fitted in an annular groove formed in the inner surface 77 of the piston 17 is engaged with an end surface of the second end 139 of the ball screw nut 130. Thus, the piston 17 and the ball screw nut 130 are coupled together so as to move together in the axial direction ST (ball nut axial direction X). When rotation of the output shaft 24 of the electric motor 20 is transmitted to the ball screw shaft 110 via the speed reduction apparatus 21 to rotate the ball screw shaft 110, the ball screw nut 130 moves in the ball nut axial direction X (axial direction ST). At this time, the piston 17 is guided by the key 19 and moves together with the ball screw nut 130 in the axial direction ST.

Accurate measurements of the linear forces being applied in a braking system are often required to provide feedback for the proper operation of the braking system. As such, ball screw assemblies in accordance with embodiments of the present invention preferably include a multi-function actuator ball screw nut 130 or ball screw nut/piston combination. The ball screw nut 130 is preferably designed for multiple functions such as its original function, acting as a mating component to the ball screw shaft 110, and additionally, providing a load cell 200 to measure forces applied within the system. The ball screw nut 130 may function as a load cell 200 since all materials undergo physical deformation (strain) under load. As best seen in FIG. 3, the ball screw nut 130 is in-line of the applied ball screw assembly's linear force (arrows 210 and 211), thereby making the ball screw nut 130 a desirable location for measuring forces applied within the braking system.

Referring specifically to FIGS. 2 and 3, the load cell 200 preferably includes a load sensing portion 221 formed by a groove 223 and one or more bores 225 formed therein, each bore configured to receive a load sensing element 220 therein. As shown, the annular groove 223 formed about the ball screw nut 130 between the first end 137 of the nut and the front end of the ball train allows for greater measurement sensitivity due to the thinned wall portion of the ball screw nut 130. Additionally, the plurality of bores 225 formed in the bottom wall of the groove 223 also allow for greater deformation of the front end 137 of the ball screw nut, thereby enhancing sensitivity. Note, the ball train 140 is omitted in FIG. 3. As shown, one or more load sensing elements 220, such as a strain gauge disposed within a cup-shaped receptacle, is further received in corresponding ones of the bores 225. Each load sensing element 220 is connected by wires 240 that run through an axial groove 241 to an external control system (not shown) for processing. Further, a protective band (not shown) of material may be disposed within the annular groove to protect the load sensing elements 220 from debris, shock, etc.

The ball screw assembly 100 with integral force measurement can be packaged in a shorter linear space through existing assemblies (FIG. 6) by eliminating externally-positioned traditional load cells 13, thereby creating a compact actuation system. Since the load measurement is now part of the ball screw nut 130, the disclosed ball screw nut 130 which acts as a load cell does not require additional system alignment and dimensional stack-up challenges as found in prior art configurations (FIG. 6). The ball screw nut 130 load cell 200 exhibits high debris tolerance, as the sensing element(s) 220 are embedded within the ball screw nut 130, with only connection wires 240 exposed to the system environment. The ball screw nut 130 can contain any type of sensing elements, such as strain, piezo electric, capacitive, or inductive.

Figure 4:
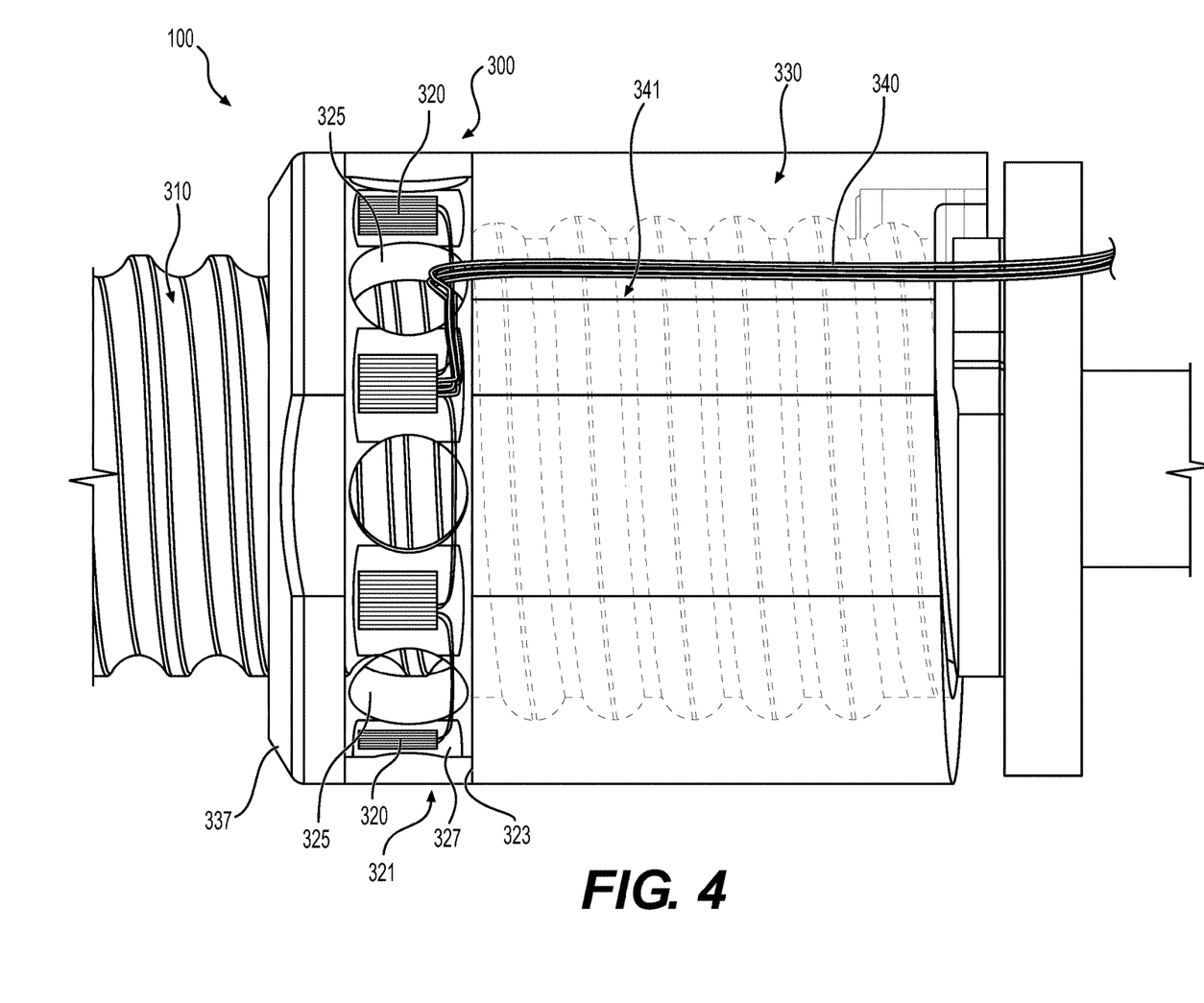
FIG. 4 is a side plan view of a ball screw assembly in accordance with an alternate embodiment of the present invention.

Referring now to FIG. 4, a load cell 203 in accordance with an alternate embodiment of the invention preferably includes a load sensing portion 321 formed by a groove 223 and one or more bores 125 formed therein with adjacent bores 325 being separated by flat portions 327 that are configured to receive a load sensing element 320 thereon. As shown, the annular groove 323 formed about the ball screw nut 330 between the first end 337 of the nut and the front end of the ball train 140 (FIG. 2) allows for greater measurement sensitivity due to the thinned wall portion of the ball screw nut 330. Additionally, the plurality of bores 325 formed in the bottom wall of the groove 323 also allow for greater deformation of the front end 337 of the ball screw nut, thereby enhancing sensitivity. Note, the ball train 140 is omitted in FIG. 4. As shown, one or more load sensing elements 320, such as a strain gauges are received on the corresponding flat portions 327 of the groove 323. Each load sensing element 320 is connected by wires 340 that run through an axial groove 341 to an external control system (not shown) for processing. In yet another embodiment, signal amplifying elements (not shown) may be secured to the flat portions 327 as well to reduce the need for external processing of the signal. Further, a protective band (not shown) of material may be disposed within the annular groove to protect the load sensing elements 320 from debris, shock, etc.

Figure 5:
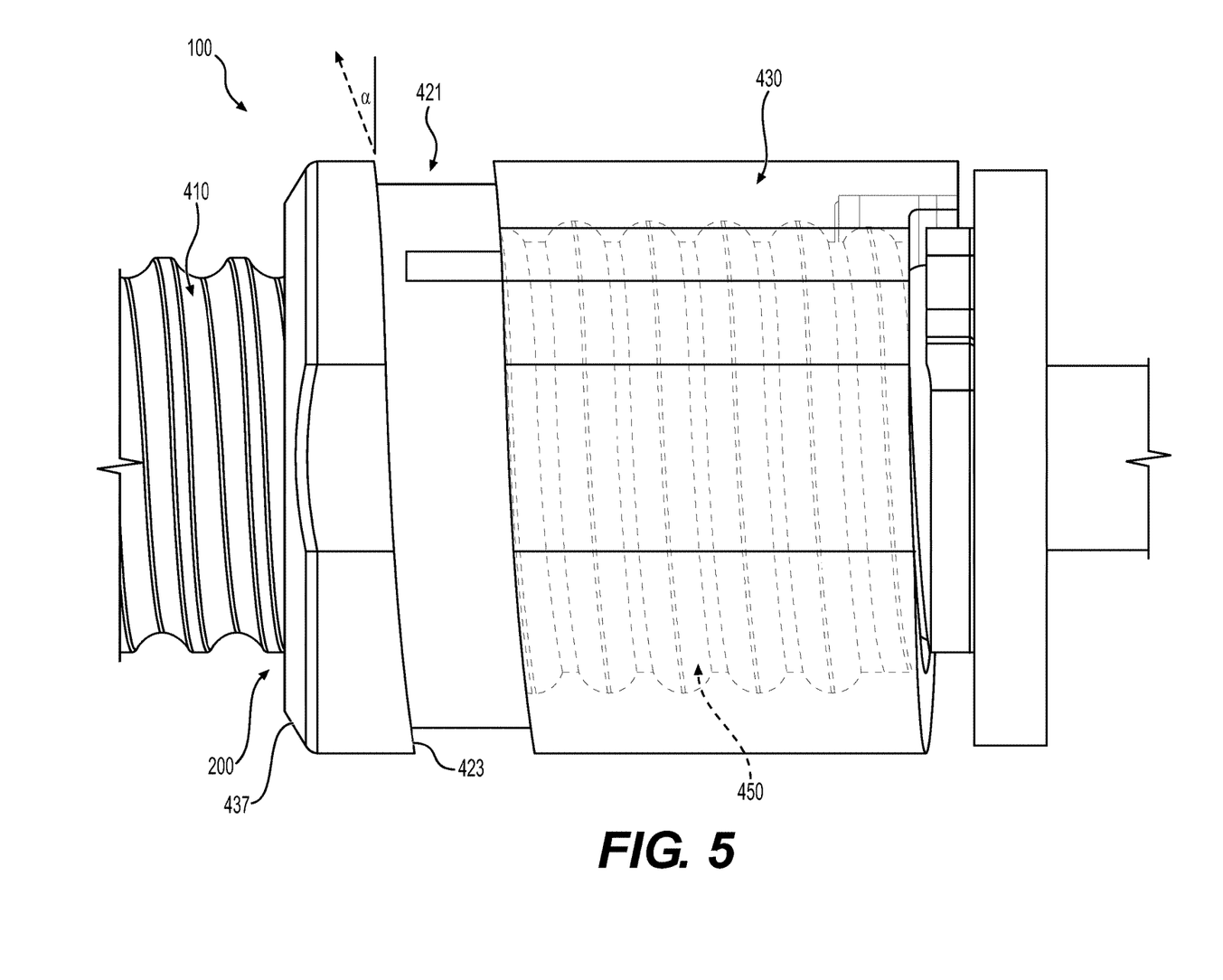
FIG. 5 is a side plan view of a ball screw assembly in accordance with an alternate embodiment of the present invention.

Referring specifically to FIG. 5, a load cell 400 preferably includes a load sensing portion 421 formed by a groove 423 that is configured to receive one or more strain gauges 320, as shown in FIG. 4, on one or more load sensing elements 220, as shown in FIG. 3, therein. When utilizing strain sensing elements 220, one or more bores (not shown) formed in the groove 423, each bore configured to receive a load sensing element 220 thereon. As shown, the annular groove 423 formed about the ball screw nut 430 between the first end 437 of the nut and the front end of the ball train 140 (FIG. 2) allows for greater measurement sensitivity due to the thinned wall portion of the ball screw nut 430. Additionally, when present, the plurality of bores (225 in FIG. 3) formed in the bottom wall of the groove 423 also allow for greater deformation of the front end 337 of the ball screw nut, thereby enhancing sensitivity. Note, the ball train 140 (FIG. 2) is omitted in FIG. 5. As shown, the groove 423 is angled with respect to the planar front end 437 of the ball screw nut 430 at an angle (a) equal to that of the helical ball raceway 450. As such, a constant distance exists between each load sensing element in the groove 423 and the ball train 140 (FIG. 2) at which the force shown by arrow 210 is transmitted to the ball train at arrows 211, as shown in FIG. 2. As such, very precise measurement of load is achieved.

While one or more preferred embodiments of the invention are described above, it should be appreciated by those skilled in the art that various modifications and variations can be made in the present invention without departing from the scope and spirit thereof. For example, the disclosed concept is not restricted to use in just a ball screw assembly system but, rather, can be applied to a standard thread (ACME, et al.) or roller screw system. As well, the present concept is also not limited to braking applications but, rather, can be used anywhere a screw and nut type system requires force feedback. It is intended that the present invention cover such modifications and variations as come within the scope and spirit of the appended claims and their equivalents.

The invention claimed is:

1. A screw-type actuator comprising:
a support structure;
a screw shaft having an outer surface, the screw shaft being retained against axial movement by the support structure but rotatable with respect to the support structure;
a nut including a first end, a second end, an outer surface, and an inner surface defining a central bore in which the screw shaft is received;
the outer surface of the screw shaft and the inner surface of the nut being engaged with one another such that rotation of the screw shaft causes axial movement of the nut; and
a sensing element affixed to the nut, the sensing element providing an electrical output of a sensed parameter,
wherein the nut defines a groove defined on the outer surface of the nut in which the sensing element is disposed, the groove being disposed in a plane that is perpendicular to a longitudinal center axis of the nut, the groove having an arcuate configuration and extending about at least a portion of a circumference of the nut.

2. The screw-type actuator of claim 1, wherein the groove defines a bottom wall at which the sensing element is mounted.

3. The screw-type actuator of claim 1, further comprising lead wires extending away from the nut for transmission of sensed information.

4. The screw-type actuator of claim 1, wherein the sensing element comprises a strain sensing element.

5. The screw-type actuator of claim 1, wherein the sensing element comprises one of a piezoelectric sensing element, a capacitive sensing element, and an inductive sensing element.

6. The screw-type actuator of claim 1, wherein:
the inner surface of the nut defines a first ball track;
the outer surface of the screw shaft defines a second ball track opposed to the first ball track to form a ball raceway; and
a plurality of balls disposed in the ball raceway forming a ball train such that the nut and screw shaft are operatively engaged.

7. The screw-type actuator of claim 1, wherein the nut defines a groove forming an angle with respect to a longitudinal center axis of the nut that is equal to an angle formed by a ball raceway and the longitudinal center axis.

8. A brake assembly comprising:
a caliper including an arm portion;
a piston disposed within the caliper, the piston being axially movable along a longitudinal center axis of the piston;
a first brake pad affixed to the arm portion of the caliper;
a second brake pad affixed to an end surface of the piston; and
a screw-type actuator including:
a screw shaft having an outer surface, the screw shaft being retained against axial movement by the caliper but rotatable with respect to the caliper;
a nut non-rotatably connected to the piston, the nut including a first end, a second end, an outer surface, and an inner surface defining a central bore in which the screw shaft is received;
the outer surface of the screw shaft and the inner surface of the nut being engaged with one another such that rotation of the screw shaft causes axial movement of the nut and piston; and
a sensing element affixed to the nut, the sensing element providing an electrical output of a sensed parameter.

9. The brake assembly of claim 8, wherein the nut defines a groove in which the sensing element is disposed, the groove being disposed in a plane that is perpendicular to a longitudinal center axis of the nut.

10. The brake assembly of claim 9, wherein a plurality of bores are defined in a bottom wall of the groove.

11. The brake assembly of claim 10, wherein the sensing element is located in one of the bores.

12. The brake assembly of claim 9, wherein the groove is defined on the outer surface of the nut.

13. The brake assembly of claim 9, wherein the groove defines a bottom wall at which the sensing element is mounted.

14. The brake assembly of claim 8, wherein the sensing element comprises one of a strain sensing element, a piezoelectric sensing element, a capacitive sensing element, and an inductive sensing element.

15. The brake assembly of claim 8, wherein:
the inner surface of the nut defines a first ball track;
the outer surface of the screw shaft defines a second ball track opposed to the first ball track to form a ball raceway; and
a plurality of balls disposed in the ball raceway forming a ball train such that the nut and screw shaft are operatively engaged.

16. A screw-type actuator comprising:
a support structure;
a screw shaft having an outer surface, the screw shaft being retained against axial movement by the support structure but rotatable with respect to the support structure;
a nut including a first end, a second end, an outer surface, and an inner surface defining a central bore in which the screw shaft is received;
the outer surface of the screw shaft and the inner surface of the nut being engaged with one another such that rotation of the screw shaft causes axial movement of the nut; and
a sensing element affixed to the nut, the sensing element providing an electrical output of a sensed parameter,
wherein the nut defines a groove defined on the outer surface of the nut in which the sensing element is disposed,
wherein a plurality of bores are defined in a bottom wall of the groove.

17. The screw-type actuator of claim 16, wherein the bores extend radially through the nut.

18. The screw-type actuator of claim 16, wherein the sensing element is located in one of the bores.

19. A screw-type actuator comprising:
a support structure;
a screw shaft having an outer surface, the screw shaft being retained against axial movement by the support structure but rotatable with respect to the support structure;
a nut including a first end, a second end, an outer surface, and an inner surface defining a central bore in which the screw shaft is received;

the outer surface of the screw shaft and the inner surface of the nut being engaged with one another such that rotation of the screw shaft causes axial movement of the nut; and a sensing element affixed to the nut, the sensing element providing an electrical output of a sensed parameter, wherein the nut defines a groove defined on the outer surface of the nut in which the sensing element is disposed, wherein the groove extends about an entire circumference of the nut.

* * * * *

UNITED STATES PATENT AND TRADEMARK OFFICE
CERTIFICATE OF CORRECTION

| | | |
|---|---|---|
| PATENT NO. | : 12,326,176 B2 | Page 1 of 1 |
| APPLICATION NO. | : 17/742756 | |
| DATED | : June 10, 2025 | |
| INVENTOR(S) | : Justin Brubaker et al. | |

It is certified that error appears in the above-identified patent and that said Letters Patent is hereby corrected as shown below:

On the Title Page

On Page 2, right column, under item (56) "OTHER PUBLICATIONS", Line 1, delete the words "Gurad Plus Status" and replace with --Guard Plus Status--

On Page 2, right column, under item (56) "OTHER PUBLICATIONS", Line 2, delete the words "Gurad Plus" and replace with --Guard Plus--

Signed and Sealed this
Twenty-third Day of September, 2025

John A. Squires
*Director of the United States Patent and Trademark Office*